United States Patent [19]
Stevens et al.

[11] 4,192,992
[45] Mar. 11, 1980

[54] ELECTRIC HEATING ASSEMBLY FOR A FUSED BATH

[75] Inventors: John M. Stevens, Detroit; Grant W. Allen, Northville; John M. Cole, Redford, all of Mich.; Timothy K. Mousseau, Sante Fe Springs, Calif.

[73] Assignee: Kolene Corporation, Detroit, Mich.

[21] Appl. No.: 920,486

[22] Filed: Jun. 29, 1978

[51] Int. Cl.² ............................................. H05B 1/02
[52] U.S. Cl. .................................... 219/494; 219/328; 219/437; 219/510; 219/523
[58] Field of Search ............... 219/328, 335, 430, 435, 219/436, 437, 439, 441, 505, 510, 511, 523, 534, 540, 550, 494; 99/337, 403

[56] References Cited
U.S. PATENT DOCUMENTS

| Re. 29,609 | 4/1978 | Wadia et al. ..................... 219/441 X |
| 3,898,431 | 8/1975 | House ................................. 219/534 |
| 4,016,403 | 4/1977 | Best ..................................... 219/550 |

Primary Examiner—Volodymyr V. Mayewsky
Attorney, Agent, or Firm—William N. Hogg

[57] ABSTRACT

A heating assembly for a fused bath is disclosed. The assembly includes a heating element within a tube. Also, disposed within the tube is a first thermocouple. A second thermocouple is positioned in the bath outside the tube. Control means are connected to the heating elements and thermocouples so that the heating of the bath is performed responsive to the temperature sensed by the second thermocouple; but, if the first thermocouple detects heat in the tube greater than a given value it will interrupt the heating operation to prevent damage to the heating elements due to over-heating.

3 Claims, 4 Drawing Figures

ELECTRIC HEATING ASSEMBLY FOR A FUSED BATH

BACKGROUND OF THE INVENTION

This invention relates generally to heating fused salt baths, and more particularly to a method and apparatus for electrically heating a fused salt bath that will prevent damage to the electrical element caused by overheating.

One conventional device for use in heating fused salt baths is shown and described in U.S. Pat. No. 4,016,403. These types of devices include a plurality of spacer elements which support electrical resistance wire elements. The spacers and wire elements are enclosed in a metal protective shell for protection against corrosive action of the bath.

This type of heater does have one serious drawback in certain environments where the bath tends to encrust on the outside of the tube casing. In such instances the encased material acts as an insulator, inhibiting heat transfer from the heating element to the bath. As the crust builds up the amount of such inhibiting of heat flow builds up. The increased insulation has two results. First, the inside of the sleeve gets hotter during any given cycle of operation, and second, a longer cycle of operation is needed to effect heat transfer from the element to the bath. These conditions can, and in fact, do cause premature failure by burn-out of the electrical elements due to over-heating.

SUMMARY OF THE INVENTION

According to the present invention a method and apparatus are provided which will prevent burn-out of the electrical elements in a salt bath heating assembly. The heating assembly includes a plurality of annular insulating spacers having an elongated central section and a flange section. The flange section is provided with a plurality of circumferentially spaced wire elements receiving holes which, when the spacers are assembled receive electrical heating elements in the form of wire or rod. Each of the spacers is also provided with means to receive a thermocouple, and a thermocouple is supported by the spacers in heat sensing relationship to the electrical elements. A metal cover surrounds the spacers and heating elements.

The heating elements are connected to a power supply through a control device. The control device is also connected to a second or external thermocouple disposed in the salt bath. The second thermocouple will regulate the operation of the heater in a regular manner. However, if the first thermocouple, in the heater element senses a temperature above a given value, it will interrupt power to the heating element irrespective of the control signal from the second or external thermocouple in the bath which is controlling the temperature of the bath. Hence, if there is a build up of crust on the outside of the sleeve of the heating device which inhibits its heat flow to such a degree that the heating element is in danger of burning out, the thermocouple inside will shut off the power to the heating element.

DESCRIPTION OF THE PREFERRED EMBODIMENT

Figure 1:
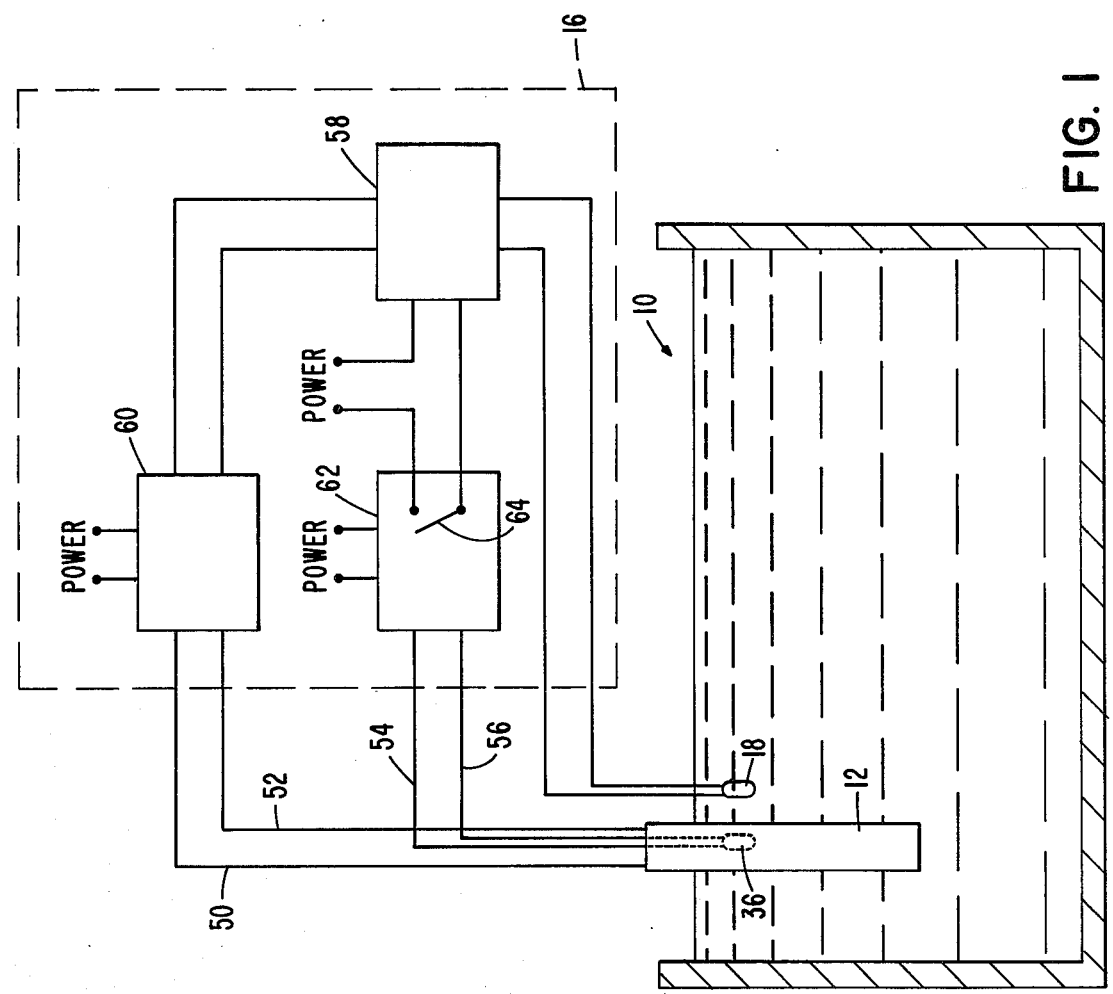
FIG. 1 is an elevational view, somewhat diagrammatic showing a heater assembly and control therefor according to this invention in a salt bath.

Referring now to the drawings, a heater assembly and control according to this invention is shown. In FIG. 1 the assembly is shown as it is used to heat a salt bath which is designated generally by the reference character 10. The device includes a heater assembly 12 immersed within the bath 10. The heater assembly 12 is connected to a power supply, through a control device 16. A separate or external thermocouple 18 is provided within the bath 10 and is connected to the control device 16, and will in a conventional manner control the supply of power to the heater assembly.

Figure 2:
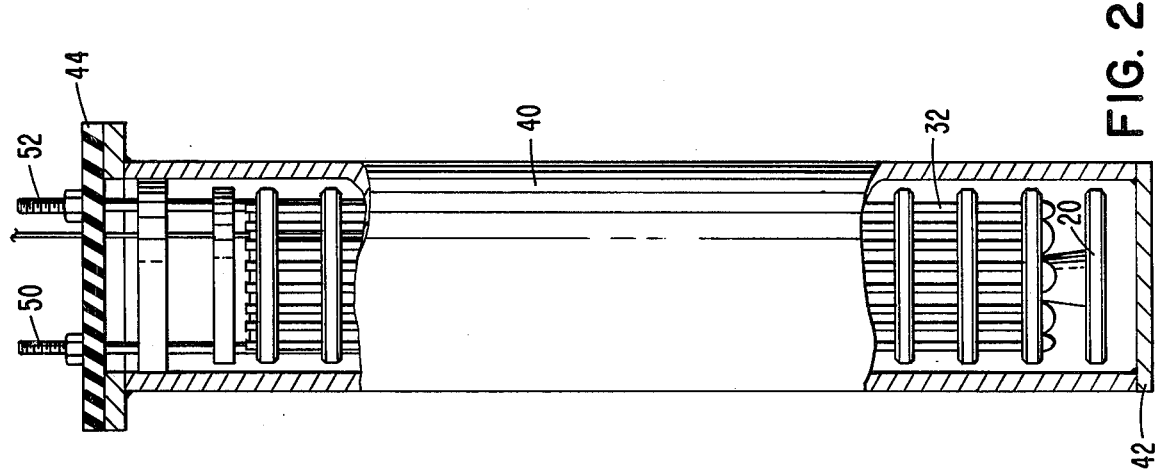
FIG. 2 is a side elevational view partially in section of a heater assembly of this invention.
Figure 3:
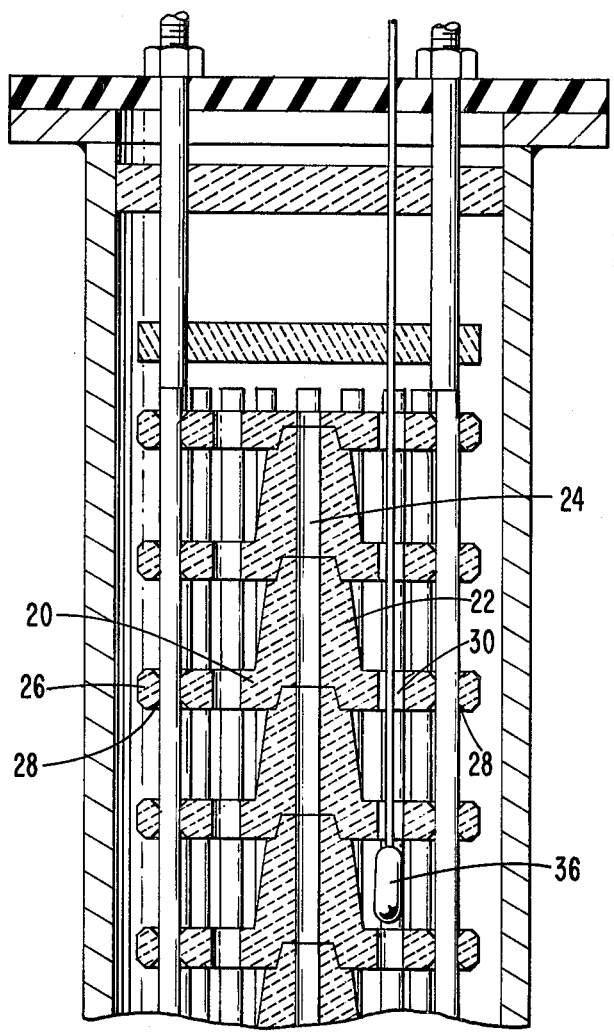
FIG. 3 is a detailed view of a portion of the heater assembly of FIG. 2 on an enlarged scale therefrom.
Figure 4:
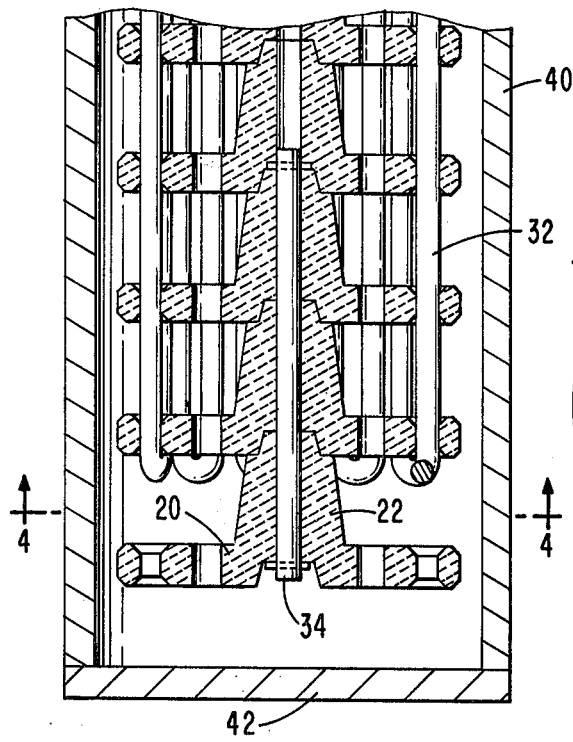
FIG. 4 is a sectional view taken substantially along the plane designated by the line 4—4 of FIG. 3.
Figure 4:
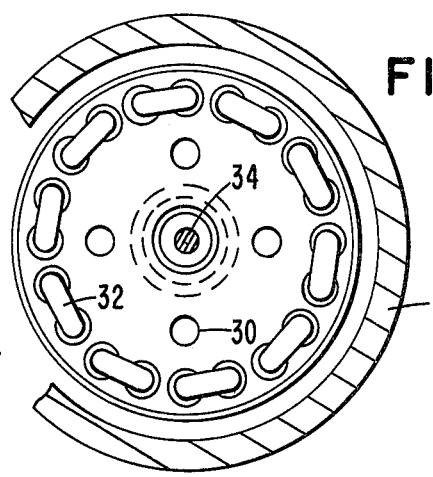

Referring now to FIGS. 2, 3 and 4 the structure of the heater assembly 12 is shown in detail.

The heater assembly 12 includes a plurality of individual annular ceramic spacers 20. Each spacer 20 includes an elongated central hub section 22, having a through central opening 24, and a surrounding flange section 26. The flange section is provided with a plurality of circumferentially spaced wire or rod receiving openings 28. Each flange 26 also has a thermocouple receiving port 30. (Several ports can be provided in each flange if desired which will make alignment of the ports easier as will become apparent. However, only one port is required).

A plurality of the spacers 20 are stacked together, as shown in FIGS. 2 and 3, to form a support for the electrical heating elements. Such electrical heating elements in the form of rod or wire 32 are looped through the openings 28 of the spacers securing them together as an unitary structure. (In many cases the electrical wire 32 will not extend to the very bottom spacer 20 so a tie rod 34 may be provided to secure the bottom spacer to the others.)

An interior thermocouple 36 is provided which extends through the thermocouple ports 28. The thermocouple may terminate anywhere along the length of the heater assembly, except that the end thereof should not be disposed within one of the ports 30; rather, the end should be exposed to the direct heat radiated by the electrical wires 32.

To complete the heater assembly 12 an enclosure case comprising an annular metal side wall 40, a metal bottom wall 42 and an electrically insulating top wall 44 are provided which surround the spacers and electrical elements and interior thermocouple, protecting them from the corrosive action of the salt bath.

Electrical leads 50 and 52 connect the heating elements 32 to the control device 16; and leads 54 and 56 connect the interior thermocouple 36 to the control device 16.

Referring again to FIG. 1, the electrical circuitry for operation of the heater is shown somewhat diagramatically. In actual operation, with additional heaters the circuitry may be somewhat more complex, however, the circuity needed is conventional in the art and does not per se constitute the invention. As shown in FIG. 1, the control device includes a bath thermocouple temperature controller 58 which connects to the thermocouple 18, and to an SCR 60 through which the thermocouple 58 modulates the power to the heater assembly 12. This circuitry will control the heater responsive to the bath temperature sensed by the thermocouple 18. The thermocouple 36 within the heating element is connected to an element limit temperature controller 62 which operates a switch 64. The switch 64 is connected in circuit relationship with the power source to the temperature controller 58. When the sensed temperature of the thermocouple 36 reaches a predetermined temperature, the controller 62 will open switch 64 which will remove power from the controller 58. This, in a well known manner, will interrupt the signal to the SCR 60, which in turn will shut off the power supplied through the SCR 60 to the heater assembly 12.

In operation, during normal heating of the salt bath 10 the thermocouple 18 will sense the temperature of the bath and through the control device 16 regulate the power supplied from the power supply 14 to the heater 12. However, if the outside of the heater becomes encrusted with material which impairs the heat flow to such an extent that the electrical elements 32 of the heater 12 reach a predetermined temperature, the interior thermocouple 36 will interrupt the power supply to the elements 32, irrespective of the signal from the exterior thermocouple 18 within the bath, thereby preventing damage of the elements 32 by over-heating.

What is claimed is:

1. In an electrical heating assembly for heating a fused salt bath in an enclosure wherein electrical heating elements are supported on electrically insulating ceramic spacer means within sealed heat conductive enclosure means, and supplied through leads with power from a power source through electrical insulating means in said enclosure means, and which enclosure means is disposed within the salt bath, and means for mounting said assembly in the bath, the improvement which comprises, first thermocouple disposed within the salt bath, second thermocouple disposed within said enclosure means supported by said spacer means and exposed to the direct radiation from electrical heating elements, and electrical control operatively connected to each of said thermocouples and to said power source through electrical leads, said control means being arranged to control the power supplied to the electrical heating elements responsive to the temperature sensed by said first thermocouple and to remove the power supplied to the electrical heating elements and thereby over-ride the control of said first thermocouple and prevent excessive heating of the electrical heating elements irrespective of the bath temperature responsive to a given temperature sensed by said second thermocouple.

2. The invention as defined in claim 1 wherein the spacer means includes a plurality of individual spacers each having flanges, said flanges supporting said electrical heating elements.

3. The invention as defined in claim 2 wherein said flanges including means to support said second thermocouple adjacent said electrical heating elements.

* * * * *